US006877729B2

(12) United States Patent
Lin et al.

(10) Patent No.: US 6,877,729 B2
(45) **Date of Patent: *Apr. 12, 2005**

(54) RECONFIGURABLE WORKHOLDING FIXTURE

(75) Inventors: Yhu-Tin Lin, Rochester Hills, MI (US); Mark A. Kramarczyk, Westland, MI (US); Gary Lee Jones, Farmington Hills, MI (US); Andrew Leslie Bartos, Clarkston, MI (US); Phillip A. Bojda, Macomb, MI (US); Chi-Hung Shen, Troy, MI (US); John Stilianos Agapiou, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/655,548

(22) Filed: Sep. 4, 2003

(65) Prior Publication Data

US 2004/0080087 A1 Apr. 29, 2004

Related U.S. Application Data

(63) Continuation-in-part of application No. 10/243,860, filed on Sep. 13, 2002, now Pat. No. 6,644,637.

(51) Int. Cl.[7] .................................................. B23Q 3/08
(52) U.S. Cl. .......................... 269/25; 269/289 R; 269/8
(58) Field of Search ...................... 269/32, 152, 289 R, 269/8, 16, 27, 24

(56) References Cited

U.S. PATENT DOCUMENTS

| | | | | |
|---|---|---|---|---|
| 3,336,551 A | | 8/1967 | Stead | |
| 4,164,344 A | | 8/1979 | Deragne | |
| 4,799,657 A | | 1/1989 | Miller | |
| 4,847,582 A | | 7/1989 | Cardone et al. | |
| 4,956,625 A | | 9/1990 | Cardone et al. | |
| 5,192,058 A | * | 3/1993 | VanDalsem et al. | 269/24 |
| 5,837,901 A | * | 11/1998 | Sola et al. | 73/856 |
| 5,867,901 A | | 2/1999 | Sola et al. | |
| 6,045,319 A | | 4/2000 | Uchida et al. | |
| 6,644,637 B1 | * | 11/2003 | Shen et al. | 269/152 |

* cited by examiner

*Primary Examiner*—Lee D. Wilson
(74) *Attorney, Agent, or Firm*—Kathryn A. Marra

(57) ABSTRACT

A reconfigurable fixture for workpieces is disclosed. It utilizes a flat surface magnetic chuck with modular workpiece supporting, locating and clamping elements that are carefully located on it and held by magnetic attraction to it. These elements are precisely located to hold the workpiece in spaced relation to the chuck surface. Some locating elements are mechanically fixed to the chuck for securing the workpiece from transverse movement on the chuck surface. Preferably, each of the supporting, locating and clamping members are fixed to separate steel bases for magnetic attraction to the chuck. Each base may also carry its own hydraulic actuator for height adjustment of a support element or for height adjustment and closure of a clamping element. These modular elements have locating slots or grooves or the like so that they can be selected from a storage magazine and located on a chuck by numerically controlled mechanisms.

15 Claims, 3 Drawing Sheets

RECONFIGURABLE WORKHOLDING FIXTURE

CROSS-REFERENCE TO RELATED APPLICATIONS

This application is a continuation-in-part of U.S. application Ser. No. 10/243,860, filed Sep. 13, 2002 now U.S. Pat. No. 6,644,637.

TECHNICAL FIELD

This invention pertains to reconfigurable magnetic workholding fixtures. More specifically, this invention relates to robust and easily re-configured fixtures comprising a flat magnetic chuck surface with magnetically attached modular supporting, locating and clamping elements that are useful for locating and securing workpieces, especially non-magnetic workpieces.

BACKGROUND OF THE INVENTION

There is a need in manufacturing operations for durable and reconfigurable workholding fixtures especially for flexible manufacturing operations. The fixtures must be readily and accurately adaptable to hold different workpiece shapes for machining applications or the like. Sometimes the workpieces are similar or related part shapes such as cast aluminum cylinder heads for different engines. In other manufacturing situations the parts may be of unrelated design but requiring similar manufacturing operations. In these varied applications, the fixture reconfiguration or changeover from one part design to another has to be fast enough to meet the productivity requirements of current manufacturing systems.

Magnetic chucks have been available for holding some magnetic workpieces. For example, magnetic chucks providing flat holding surfaces are commercially available under the trade designation “Quadsystem” by Technomagnete S.p.a. These chucks are provided with a plurality of magnetic pole pieces often arranged in a rectangular grid on a base plate within peripheral walls. Apart from the coils that energize or de-energize the steel pole pieces, the chuck also includes high energy permanent magnets (neodymium-iron-boron magnets) interspersed among the poles. U.S. Pat. Nos. 4,847,582 and 4,956,625 appear to describe such flat surface chucks. Suitably placed and oriented electrical coils permit the chuck to be magnetized to different levels and demagnetized for locating, securing and removing a magnetizable work piece. However, this chuck has not proven useful for securing and machining non-magnetic workpieces such as, e.g., cast aluminum alloys.

It is an object of this invention to provide a fixture utilizing a magnetic chuck for workpieces, especially non-magnetic workpieces. It is a more specific object of this invention to provide an easily reconfigured workpiece holding fixture comprising a magnetic base and modular workpiece supporting, locating and clamping elements.

SUMMARY OF THE INVENTION

In accordance with a preferred embodiment of this invention a workholding fixture basically comprises an electromagnetic chuck and several modular fixture elements for locating, clamping, and supporting a non-magnetic workpiece. Such a fixture is also useful for iron or steel workpieces.

A suitable magnetic chuck is one that can be energized and de-energized with an electric pulse from a stationary electric power source. Thus, the magnetic chuck provides a fast attach/release capability and a flat surface on which modular workpiece supporting, locating and clamping elements can be securely held by the magnetic force. Preferably, the strength of the field can be varied from a first level for sensitive and accurate modular element placement to a second, higher level for strongly securing the elements. In addition, the energized magnetic chuck can maintain its magnetic attractive force even when the chuck is disconnected from the power source. This is important because it provides the required mobility of the workholding fixture to be transferred from one machining station to another machining station.

The autonomous integrated modular clamping or supporting elements are designed and constructed to be precisely located on the flat surface of the magnetic chuck and to then receive and securely hold a non-magnetic workpiece for a machining or other manufacturing operation. The work piece may be a nonferrous alloy such as an aluminum or magnesium alloy or the like. The workpiece is held spaced apart from the magnetic chuck by suitably located and cooperating supporting, locating and clamping members.

The supporting, locating and clamping elements may be individually carried on a suitable base plate. The base plate is preferably made of steel or other magnetizable alloy and sized so that the support or clamp is tightly held on the magnetized chuck plate. Support or clamp posts stand upright from the base plate. In one embodiment, the support is simply a post of predetermined length fixed at one end to the base plate with the other end configured to engage and support a surface of a workpiece. The length of the support post is determined by the shape of the work piece and its intended distance from the chuck surface. The clamp is typically a rotatable horizontal arm attached to the upper end of a post carried by a base plate. Clamp arms of varying shapes may be used to accommodate different workpieces.

In addition to the magnetically attached locating, supporting and clamping elements, the fixture preferably comprises a rigid guide rail and at least one locator element (which is also a support element) that are precisely located and mechanically fixed to the surface of the magnetic chuck. These mechanically fixed elements constrain the workpiece from transverse movement on the chuck surface. Movable locator elements used in combination with these fixed elements assure that the fixture is suitably reconfigured for different cylinder heads or other workpieces.

In its simplest terms the fixture comprises a magnetic chuck with a mechanically fixed guide rail and locator element, and at least one support element and one clamp arm element each secured to the surface of the chuck by magnetic force. Generally, a plurality of the magnetically attached elements will be located on the chuck surface to cooperate in holding the workpiece for a machining operation or the like. However, in a preferred embodiment of the invention, the height of the movable support elements and clamping elements are not fixed, they are adjustable to accommodate different workpieces.

In support elements or clamping elements of adjustable height, the posts can, for example, be fitted into a cylinder or other housing and threaded for screw height adjustment, or adjusted hydraulically. Such support and clamping elements are commercially available. Hydraulic height adjustment of post height may require that the base plate be modified to accommodate suitable hydraulic pressure supplying components.

The magnetic chuck and modular support and clamp elements allow a fixture to be easily assembled or modified.

For example, support and clamp elements can be individually selected from a suitable inventory or storage magazine by a numerically controlled robot and precisely located on a magnetic chuck surface. The element-placing robot arm will have a suitable gripping adapter to grip the support or clamp element and place it base down on the chuck surface. Similarly, support and clamp elements are removed from the chuck when the need for the present fixture assembly is finished. The chuck is partially magnetized for element placement and removal and fully magnetized to secure the elements to the chuck in the working fixture.

The fixed guide rail and locator post(s) are located for general fixture applications. The magnetically attached locator, support and clamp elements are positioned for each workpiece configuration. They are positioned so that the clamp arms can press against a surface of the workpiece and force it against a suitable surface piece on the top of each support post. The workpiece is hoisted and placed against the support posts and the arms of the clamps rotated into position engaging the workpiece.

The assembled fixture can be situated horizontally or vertically, or in any desired attitude with the workpiece securely held by the clamping elements against the locator and support elements in a position spaced from the surface of the chuck. The combination of the mechanically fixed and magnetically fixed supporting, locating and clamping elements holds the workpiece for machining or the like, even with heavy stock removal.

In another embodiment of the invention the roles or positions of the large magnetic chuck plate surface and the support plates for the support or clamp elements are reversed. In this embodiment, the fixture system essentially consists of a large conventional, magnetizable steel fixture plate and a collection of modular fixture elements for locating, clamping, and supporting a workpiece. The modular elements are all mounted on magnetic holding bases of some common dimensions. These magnetic holding bases are smaller versions of the magnetic chuck plates described above. The magnetic holding base for the support or clamp elements can be an electro-permanent magnet construction so that it can be activated or de-activated with an electric switch. Alternatively, it can be a simple lift magnet design activated by a mechanical lever. The magnetic holding base will carry a support and/or clamp element and optionally a hydraulic pressure supplying component. The role of the magnetic holding base is to provide a fast attach/release capability to the flat steel fixture plate and also a platform on which a modular fixture element can be affixed mechanically. In addition, the activated magnetic support or clamp base will maintain its magnetic attractive force when the base is disconnected from the electric source or as long as the mechanical lever stays in the same position. This portability provides the required mobility of the smart workholding fixture plate to be transferred from one machining station to another machining station.

Other objects and advantages of the invention will be understood from a description of preferred embodiments. Reference will be made to drawing figures that are described in the following section.

DESCRIPTION OF THE PREFERRED EMBODIMENT

Figure 1:
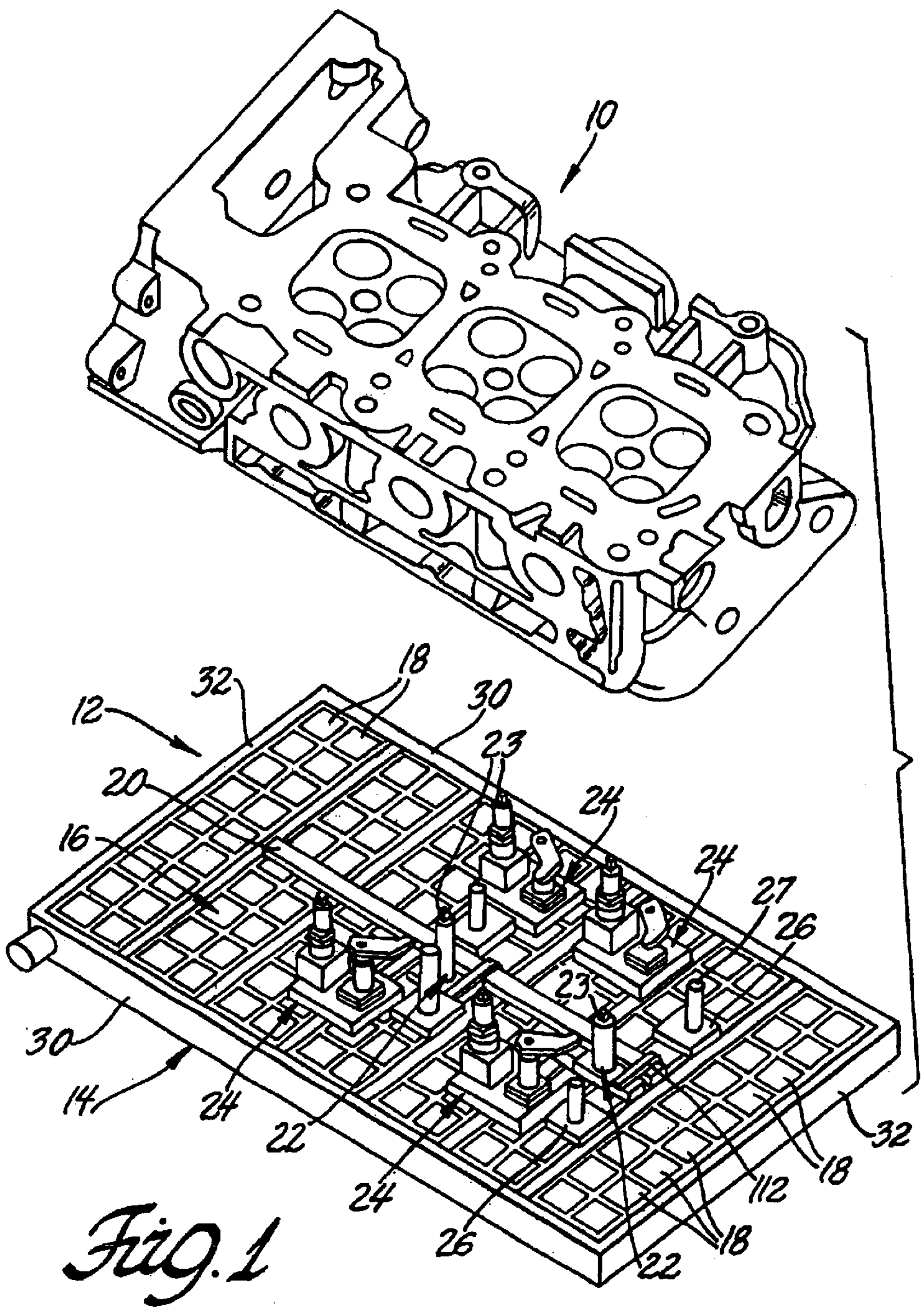
FIG. 1 is an exploded, generally plan view of an assembled workpiece fixture in accordance with the invention with an overlying aluminum cylinder head.

The practice of the invention will be illustrated by describing a fixture for machining of an aluminum alloy cylinder head for an automotive vehicle engine. Such a part is typically cast of a silicon containing, aluminum alloy as close to final shape as possible. However an automobile engine cylinder head casting is a very complex structure. The cylinder head shown schematically in FIG. 1 at 10 is for a three cylinder engine. The cylinder head contains openings for four valves in each cylinder, openings for spark plugs, intake passages for air and exhaust passages for exhaust gas. The head also contains oil passages and passages for coolant. It is a complex structure that requires a considerable amount of machining following the casting operation.

In order to facilitate such machining the cylinder head must be securely held in a fixture so that numerically controlled machine tools can properly remove metal from the casting to arrive at its specified finish dimensions. A reconfigurable, magnetic fixture to support and hold cylinder head 10 is shown generally at 12 in FIG. 1. Fixture 12 includes a magnetic chuck 14 that, in this example, has a complex flat rectangular working surface (indicated generally at 16) of many magnetic pole elements 18. Applied to the surface 16 of chuck 14 are a number of fixture elements that are movable to accommodate varying workpiece shapes or machining positions.

Fixture 12 also includes a rigid guide rail 20 that is bolted, or otherwise suitably fixed, to surface 18 of the magnetic chuck 14. Guide rail 20 is illustrated as straight but it may be of any desired length or configuration. Also, clamped to guide rail 20 are two locator post elements 22 that are thus mechanically fixed to the surface 18 of chuck 14 (see FIG. 5 for a suitable clamping arrangement). On the top of each locator posts 22 are pins 23 that are shaped and located for fitting into locator holes (sometimes termed B-C holes not seen in FIG. 1) formed in the bottom of cast cylinder head 10. The B-C holes serve to facilitate precise location of the workpiece for machining operations. Guide rail 20 and locator posts 22 are important in precisely locating and rigidly supporting a massive work piece such as cylinder head 10. Furthermore, they assist the magnetic chuck 12 in keeping workpiece 10 from sliding transversely on surface 18 under dynamic or impact machining forces.

Also attached by magnetic attraction to flat surface 16 of magnetic chuck 14 are several self-contained modular hydraulically adjustable and actuated clamping elements 24 and several modular support elements 26 of fixed height. Both the clamping elements 24 and support elements 26 are shown schematically in FIG. 1. In FIG. 1 the hydraulic clamping elements 24 are identical to each other and the fixed height support elements 26 are identical to each other. It may be preferred to use identical modular clamping and support elements for simplicity of inventory and reconfiguration of the fixture. But these elements don't have to be of common design. Similarly, the support elements in FIG. 1 are illustrated as simply having a base 29 with a post 27 of fixed length. However, the support elements 26 may also be provided with hydraulic height adjustments like the clamping elements 24. A representative clamping element is shown in more detail in FIGS. 2 and 3, and an adjustable support element is shown in FIG. 4.

The support elements 26 are located so as to space cylinder head 10 from chuck surface 16 and to support it from deflection during machining operations. The clamping elements have clamp arms 28 (best seen in FIGS. 2 and 3) that are rotatable from an open position when cylinder head 10 is being placed on the fixture, or removed from it, to a closed position. In the closed position the clamp arms engage a flange or other portion of the cylinder head. Clamps 24 press the cylinder head against the tops of the support members 26.

While the guide rail 20 and locator posts 22 are mechanically attached to the magnetic chuck 12, the modular support elements 26 and clamp elements 24 are held to the chuck surface 16 by its magnetic field.

As stated above, magnetic chucks are commercially available in a variety of sizes and shapes. Chuck 12 is larger than the footprint of cylinder head 10. In a representative commercial embodiment, chuck 12 has a steel base, not seen in FIG. 1, with opposing rectangular side walls 30, 32. Supported on the base and confined within side walls 30, 32 are many steel cubes that serve to concentrate magnetic flux and as magnetic poles. Only the upper flat surfaces 18 of the cubes are seen in FIG. 1 and there are 126 such pole surfaces in this embodiment. Each polar square (typically 50 mm by 50 mm) is an independent magnet body presenting a magnetic pole at surface 16. And each such square 18 is surrounded on the other four cube sides by smaller magnets of opposite polarity. Embedded electric coils serve to magnify and de-magnify the magnetic pieces. The construction and assembly of the magnets assures that the magnetic flux produced by the chuck runs flat and horizontally at the surface 16 of chuck 12. The coils around the reversible permanent magnets can be energized to generate a strong momentary electromagnetic field and they are capable of reversing the polarity of the chuck. Thus a relatively low magnetic field may be initially applied to assist in holding and locating the modular clamping 26 and support 24 members without jerking them to the surface 16 of the chuck. But the magnetic field can be substantially increased to strongly hold the modular pieces to the surface of the chuck. When it is time to reconfigure the workpiece fixture the magnetic field is partially turned off and the pieces removed.

The external frame of the chuck has the mechanical function of containing the magnetic components. It also serves to convey the magnetic flux lines so as to insulate the active surface of the chuck from other machine or processing elements.

Figure 2:
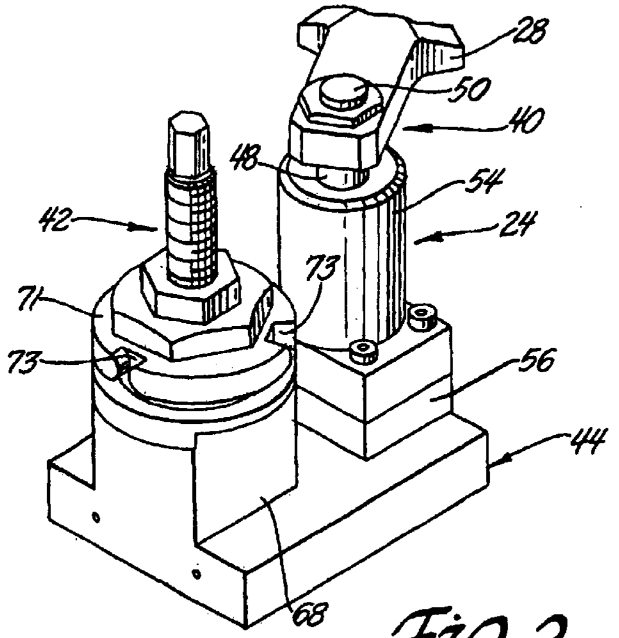
FIG. 2 is an oblique view of a modular, self contained hydraulic clamping element, comprising a hydraulically actuated clamp arm and a screw actuated hydraulic pump both contained in a steel base member, suitable for use in a workpiece fixture of this invention.
Figure 3:
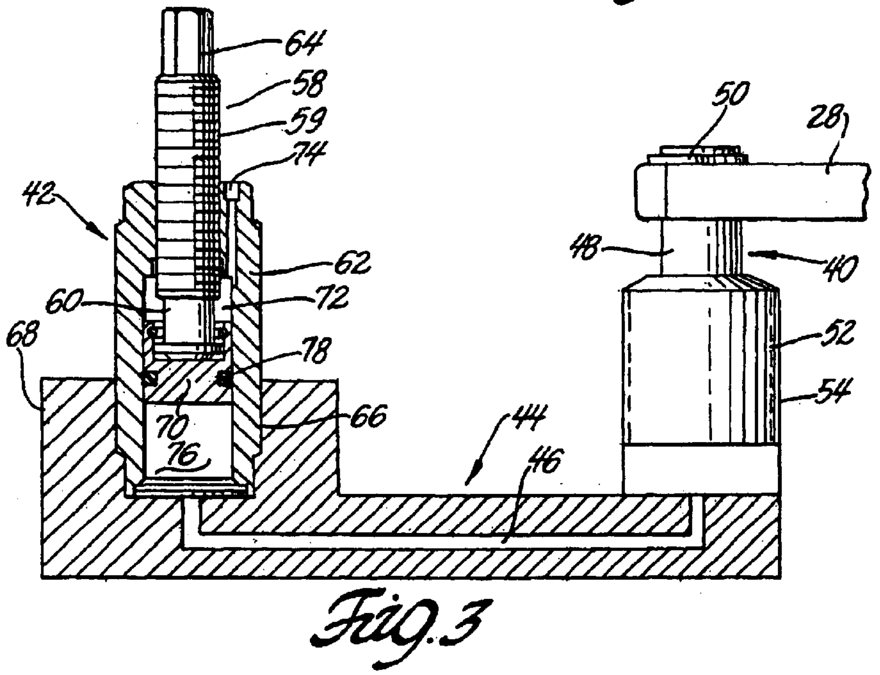
FIG. 3 is a side view, partially in cross-section of a modular clamp assembly similar to that of FIG. 2.
Figure 4:
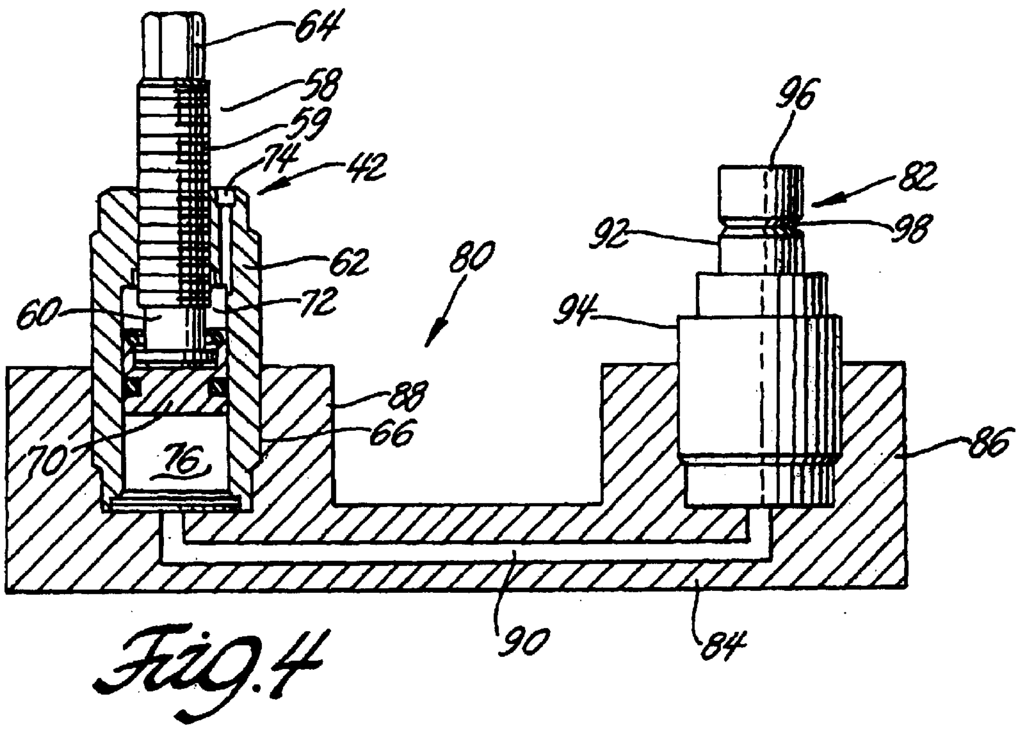
FIG. 4 is a side view, partly in cross-section, of a modular, self contained hydraulic support element and screw actuated hydraulic pump both contained in a steel base member, suitable for use in workpiece fixture of this invention.

An illustrative modular clamping element 24 for use in the workholding fixture of this invention is shown in FIGS. 2 and 3. Clamping element 24 comprises a hydraulically actuated and lockable clamping cylinder and arm 40 of a known type. The clamping element 24 also contains a hydraulic screw pump 42 of a known type. However, in the practice of this invention, screw pump 42 and the hydraulic clamping arm 40 are fixed in a specially designed base 44. Base 44 preferably made of a ferrous metal alloy such as steel. The steel base 44 is large enough to receive a suitable screw pump 42 and hydraulic clamping arm 40. But it is also sized and constructed so as to concentrate magnetic flux lines from the magnetic chuck 14 to be strongly attracted to surface 16. One suitable clamp base is rectangular as seen in FIG. 2 with dimensions of 100 mm×125 mm. Base 44 also provides a channel 46 (FIG. 3) for hydraulic fluid between screw pump 42 and clamp 40.

Hydraulic clamping arm devices suitable for use in the practice of this invention are commercially available. Such a device comprises a clamp arm 28 attached to the end of a rod 48, such as by a bolt 50. Rod 48 extends into one end of a hydraulic cylinder 52 (FIG. 3). The other end of cylinder 52 admits hydraulic fluid that applies force to the rod 48, or a piston affixed to it. Upon the application of fluid pressure (such as from screw pump 42 through channel 46), the mechanism within cylinder rotates rod 48 and arm 28 to a clamping position. When fluid is withdrawn from cylinder 52, rod 48 is retracted and arm 28 rotated to a clamp release position. Depending upon the specifications of the commercial device, arm 28 may be rotated, e.g., ninety degrees and the stroke of rod 48 may be 11 to 25 mm.

Various commercial clamps are available depending upon the height required for clamp arm 28 and different clamp arm shapes are available. In FIGS. 2 and 3, arm 28 is illustrated as being straight. However, clamp arms with intermediate bent sections provide higher or lower height adjustments.

The hydraulic clamp mechanism 40 is fixed within tube 54 and attached upright to base 44. As illustrated in FIG. 2, a spacer 56 may also be used to alter the height of clamp arm 28.

In modular clamp unit 24, hydraulic clamp 40 is used in combination with a hydraulic screw pump 42. Such pumps are commercially available. However, in the practice of this invention, the screw pump is inserted upright into a bore 66 in elevated portion 68 of magnetic base 44 (see FIG. 3). Screw pump 42 contains a rod 58 with helical threads 59 along the central portion of its length. One end 60 of rod 58 is inserted in threaded 59 engagement into hydraulic cylinder 62. The upper end 64 of rod 58 is a hexagonal nut for manual or robotic actuation of the pump 42. The lower end 60 of rod 58 is attached to piston 70. The space 72 within cylinder 62 above piston 70 is vented 74 to the atmosphere. Space 76 below piston 70 contains hydraulic fluid which also fills channel 46 and the fluid space of hydraulic clamp 40. Seal 78 provides a fluid barrier between piston 70 and cylinder 62.

The structure of screw pump 42 in FIGS. 2 and 3 is the same. In FIG. 3 the pump 42 is simply shown as inserted into elevated portion 68 of base 44. In FIG. 2, screw pump 42 in enclosed in a cover piece 71 with slots 73. This cover piece 71 with slots 73 is to facilitate robotic grasping of the modular clamping element 24 for placing on, and removal from, magnetic chuck 14.

When the screw pump rod 58 is rotated so as to drive hydraulic fluid into the hydraulic clamp, the clamp is initially rotated from a non-clamping position to its clamping position. At the same time the clamp is lowered by a half inch or so until it comes into engagement with a work piece such as a flange surface or other suitable surface on the aluminum cylinder head. So long as the hydraulic pressure is then maintained by the screw pump, the clamp arm remains locked in position. When it is time to release a work piece, the screw pump rod 58 is reversed, piston 70 is lifted and hydraulic fluid flows back from the modular clamp body. Clamp arm 28 is raised and turned from its clamping position.

FIG. 4 illustrates a three component, hydraulically adjustable, modular support element 80 suitable for use in an embodiment of this invention. Different support posts have been used in the practice of this invention. Some have been of fixed height and some were adjustable. These supports are the workpiece locators in the direction perpendicular to the base 16 of the fixture 12. In principle, three support elements could be sufficient to define a locating plane for the workpiece. However, extra supports can be added to bear loads more evenly and to reduce workpiece deflection during machining. In one embodiment a simple flat top post of suitable length was mounted on a 75 mm by 75 mm magnetic steel base. These support posts are illustrated at 26 in FIG. 1. These structures are useful where the support height is fairly constant in different fixture requirements. However, hydraulically adjustable modular units can also be used.

A three component modular support unit 80 is illustrated in cross section in FIG. 4. Again, hydraulic support units are commercially available in different sizes and capacities. A representative hydraulic support unit 82 is obtained and adapted for support in an upright pedestal portion 86 in steel base 84. The steel base 84 also receives an upright hydraulic screw pump 42 in pedestal portion 88. Screw pump 42 in this support module may be the same as the screw pump used in the clamping module 24. The screw pump was illustrated in cross-section and described in connection with FIG. 3. It is similarly illustrated in FIG. 4 but the identical description will not be repeated. Base 84 also contains a hydraulic fluid channel 90 connecting screw pump 42 and hydraulic support 82.

Hydraulic support unit 82 includes a rod 92 inserted within hydraulic cylinder 94. Cylinder 94 is fixed in base pedestal 86. Screwed into the upper end of rod 92 is a workpiece support surface body 96. Support surface 96 is shown to be generally flat but may be shaped as desired for contact with a workpiece. In a suitable commercial support element like 82 the other end of rod 92 engages a compression spring (not shown) carried on the base of the support element. The lower end of cylinder 94 contains an opening (not shown) for hydraulic fluid which is admitted into cylinder 94 from screw pump 42 through channel 90 to lock the desired position of rod 92. Rod 92 also preferably contains a V-groove 98 for engagement with an adapter used for placing modular support 80 at a predetermined x-y coordinate position on surface 16 of magnetic chuck 12.

The height of support surface 96 is adjusted with the module 80 on the surface 16 of chuck 14. Surface 96 and rod 92 is pushed down against such compression spring to a precise predetermined height. In general, the height of support surface 96 above chuck surface 16 can be controlled to a part of a millimeter. This adjustment may be made manually or with mechanical robotic assistance. Hydraulic fluid pressure is then applied by screw pump 42 in cylinder 94 to hydraulically lock the hydraulic support 82 in position.

Figure 5:
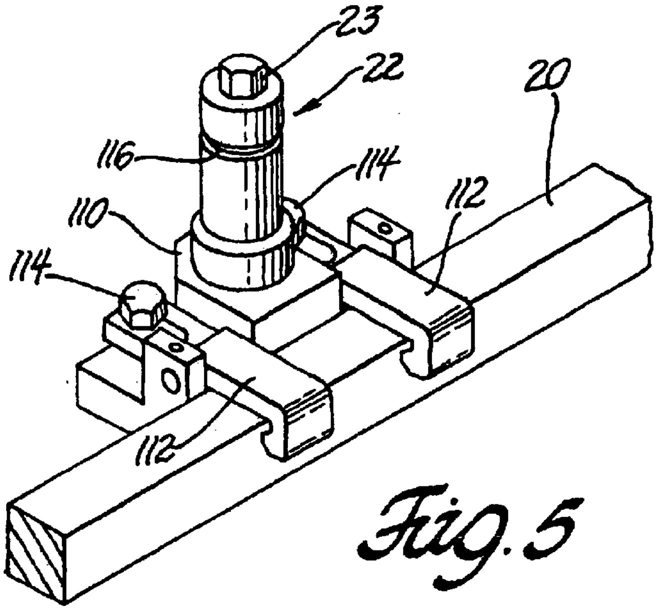
FIG. 5 is an oblique, fragmentary view of a locator element, clamped to a guide rail for use in a workpiece fixture of this invention.

FIG. 5 is a fragmentary view of the clamping mechanism for securing the locator elements 22 to the guide rail 20. Each locator element 22 is fixed to a steel base 110. A pair of clamp arms 112 on base 110 fix the locator element 22 to rail 20. After the locator element 22 with its workpiece engaging tip 23 has been precisely positioned against rail 20, clamp arms 112 are locked by screws 114. As stated above locator tips 23 engages the workpiece in a locator hole such as the B-C holes formed in cylinder heads and like engine castings.

A principle feature of this workholding fixture system is to reconfigure a part holding fixture quickly and automatically at a suitable fixture setup station using the modular supporting, locating and clamping components described above in this specification. The fixture setup station may, for example, be organized like a state-of-the-art multi-axis machining center in which a numerically controlled robot (CNC) is programmed to select a cutting tool and perform a machining operation on a precisely fixtured workpiece. A state-of-the-art pick and place robotic station may be selected if its accuracy and repeatability lies within the tolerance requirements of the intended machining and fixturing applications. In any case, the special fixture setup station needs CNC servo drives to control its X-, Y-, and Z-motions accurately. For this fixture setup application, the programmable cutting tool storage magazine and the automatic cutting tool changer is redesigned into a fixture element storage magazine and a fixture element changer. The end of the machine spindle nose will have a special adapter so that a modular fixture element can be swiftly attached to or released from it. The adapter is configured, for example, to engage cover 71 with slots 73 on a screw pump 42 of a clamping element as shown in FIG. 2 or to engage V-groove 98 on modular support element 80 (FIG. 4) or V-groove 116, or the like on a locating element 22 as shown in FIG. 5. Thus, the machine spindle nose selects and places the locating, supporting and clamping elements on a suitably positioned magnetic chuck 14 to configure a workpiece fixture 12 as seen in FIG. 1.

In the first fixture setup station, the magnetic chuck is brought to the station table, hooked up to a power source, and energized at a reduced magnetization level (for a horizontal spindle machining center, the magnetic chuck will be located on the pallet). A modular fixture element (locating 22 in FIG. 1, clamping 24, or supporting 26) as dictated by the specific part fixture design is gripped by the fixture element changer from the storage magazine and attached to the spindle nose adapter. The XY drives of the fixture setup station will move simultaneously so that a precise X-Y coordinate position on the magnetic chuck 14 is aligned with the spindle nose adapter centerline, i. e., the centerline of the fixture element base plate. The fixture element is then brought very close to the surface 16 of the magnetic chuck 14 by the motion of the Z axis. Once the fixture element base plate (for example, clamp base plate 44 or support base plate 84) is in solid contact with the magnetic chuck 14, the fixture element is released by the spindle nose adapter. The fixture element automatically attaches itself gently to the X-Y coordinate location on the magnetic chuck surface 16 by the magnetic attractive force. The reduced pre-selected magnetization level is to ensure the fixture element will not be slamming violently onto the chuck. If a hydraulic work support cylinder element is to be used as a locating element, then a command is given to the machine to push in and lock up the support cylinder plunger at the desired height. The fixture setup program then initiates the next round of commands to setup the second fixture element, the third element, and so on. After all the modular fixture elements are set up accurately in their respective positions, the magnetic chuck 14 is energized so as to hold the modular elements (24, 26, 80) with the designed maximum holding power.

Then, the part 10 will be laid on the fixture 12 (FIG. 1) by an overhead gantry loader or other material handling equipment. The spindle nose adapter will pick up a wrench type of device (a nut-runner with a torque limiter) from the storage magazine and actuate the screw pumps 42 in the various supporting 80 and clamping elements 24 in a prescribed sequence. Finally, the magnetic chuck 14 together with its fixture elements and the clamped part is transferred to a designated machining station for processing.

It is a necessary and common practice to orient and fixture the part differently several times in a complex machining line so that various part surfaces and design features can be accessed for machining. Hence, it is envisioned that there will be similar number of fixture setup stations interspersed among the machining stations for the purpose of re-fixturing. When a part locked up by the modular fixture elements and its magnetic chuck is brought to one of these fixture setup stations, the part is unclamped and released from the fixture. It will then be located and clamped onto a different fixture and transferred down the production line. The previous fixture is recycled to its originating setup station upstream to be used again. It is estimated that the total time for unclamping, transferring, and clamping the part at the fixture setup station will be well within the typical cycle time for the machining line and so there will be no loss in the overall line throughput.

An alternative way of setting up the fixture is to use the machine tool for both machining and fixturing. Most of the modern CNC machine tools or machining centers are accurate enough to carry out precise fixturing. This practice would save capital investment in a dedicated setup station but the production tool would lose a few productive cycles during changeover.

During the transition phase of a changeover to machine a new part design (in-family or cross-family), the magnetic chuck has to be de-magnetized and the modular fixture elements need to be re-arranged to form new fixturing configurations at all the fixture setup stations. Depending on the cycle time of the machining line, there may or may not be a lower throughput of the line during the transition. For example, if the fixture re-arrangement takes 5 to 6 minutes and the machining cycle time is longer than that, then the changeover for a new part design will be transparent to the production system.

It is to be understood that the function of the large magnetic chuck plate 14 could be incorporated into the support bases for the support or clamp elements. The large magnetic chuck could be replaced with a steel plate of suitable size and shape, for example, like that of the chuck 14 illustrated in FIG. 1. Smaller versions of the chuck plate would then be adapted as, for example, base 44 for clamp 40 in FIGS. 2 and 3 or base 84 for support 82 as depicted in FIG. 4. The chuck plate bases would be adapted to carry, a hydraulic pressure supplying component like screw pump 42 shown in FIGS. 2–4 and hydraulic fluid channels like channel 46 in FIG. 3 and channel 90 in FIG. 4.

Thus, in this embodiment, the fixture system essentially consists of a large conventional, magnetizable steel fixture plate and a collection of modular fixture elements for locating, clamping, and supporting a workpiece. The modular elements are all mounted on magnetic holding bases of some common dimensions. These magnetic holding bases are smaller versions of the magnetic chuck plates described above. The magnetic holding base for the support or clamp elements can be an electro-permanent magnet construction so that it can be activated or de-activated with an electric switch. Alternatively, it can be a simple lift magnet design activated by a mechanical lever. The magnetic holding base will carry a support and/or clamp element and optionally a hydraulic, pressure supplying component. The role of the magnetic holding base is to provide a fast attach/release capability to the flat steel fixture plate and also a platform on which a modular fixture element can be affixed mechanically. In addition, the activated magnetic support or clamp base will maintain its magnetic attractive force when the base is disconnected from the electric source or as long as the mechanical lever stays in the same position. This portability provides the required mobility of the smart workholding fixture plate to be transferred from one machining station to another machining station.

While the invention has been described in terms of certain preferred embodiments it is apparent that other embodiments could readily be devised by one skilled in the art. The scope of the invention is to be considered limited only by the following claims.

What is claimed is:

1. A modular fixture member for holding a workpiece to a magnetized flat chuck plate comprising:

a base of ferromagnetic material for magnetic attachment to the chuck plate, a hydraulically actuated workpiece support member fixed to said base, a hydraulic pump for delivery of hydraulic fluid to and from said support member, said pump being fixed to said base, and a fluid channel in said base for transporting hydraulic fluid between said pump and said support member.

2. The fixture member as recited in claim 1 in which one of said hydraulic pump and said support member comprises a locating slot for engagement with an adaptor to a numerically controlled machine for placing said fixture member in a predetermined location on the chuck plate.

3. The fixture member as recited in claim 1 in which said support member comprises a support post for engaging the workpiece, said post comprising a rod slidable in a support member cylinder, said cylinder being adapted to receive hydraulic fluid for adjusting or maintaining the position of said post.

4. The fixture member as recited in claim 1 in which said support member comprises a clamp arm for engaging the workpiece, said clamp arm being carried on a rod slidable and rotatable in a cylinder, said cylinder being adapted to receive hydraulic fluid for rotating and adjusting the position of said rod.

5. The fixture member as recited in claim 1 in which one of said hydraulic pump and said support member comprises a locating indentation for engagement with an adaptor to a numerically controlled machine for placing said fixture member in a predetermined location on the chuck plate.

6. A modular fixture member for holding a workpiece to a magnetizable chuck plate comprising:

a base of ferromagnetic material for magnetic attachment to the chuck plate, a hydraulic workpiece clamp member fixed to said base, a hydraulic screw pump for delivery of hydraulic fluid to and from said clamp member, said pump being fixed to said base, and a fluid channel in said base for transporting hydraulic fluid between said pump and said clamp member.

7. The fixture member as recited in claim 6 in which said clamp member comprises a clamp arm, said clamp arm being carried on a rod slidable and rotatable in a clamp member cylinder, said cylinder adapted to receive hydraulic fluid for rotating and adjusting the position of said rod.

8. The fixture member as recited in claim 6 in which one of said clamp member and said pump comprises a locating slot for engagement with an adaptor for placing said fixture member on the chuck plate.

9. The fixture member as recited in claim 6 in which said hydraulic screw pump comprises a locating slot for engagement with an adaptor for placing said fixture member on the chuck plate.

10. The fixture member as recited in claim 6 in which said clamp member comprises a locating slot for engagement with an adaptor for placing said fixture member on the chuck plate.

11. A modular fixture member for holding a workpiece to a chuck plate comprising:

a base of ferromagnetic material, said base being adapted for magnetic attachment to the chuck plate, a hydraulically actuated workpiece support member fixed to said base, a hydraulic screw pump for delivery of hydraulic fluid to and from said support member, said pump being fixed to said base, and a fluid channel in said base for transporting hydraulic fluid between said pump and said support member.

12. The support member as recited in claim 11 in which said support member comprises a support post adapted to engage the workpiece, said post comprising a rod slidable in a support member cylinder, said cylinder adapted to receive hydraulic fluid for adjusting or maintaining the position of said post.

13. The fixture member as recited in claim 11 in which one of said pump and said support member comprises a locating slot for engagement with an adaptor for placing said fixture member on the chuck plate.

14. The fixture member as recited in claim 11 in which support member comprises a locating slot for engagement with the adaptor for placing said fixture member on the chuck plate.

15. The fixture member as recited in claim 11 in which said hydraulic screw pump comprises a locating slot for engagement with an adaptor for placing said fixture member on the chuck plate.

* * * * *